United States Patent [19]

Traut

[11] 4,094,560
[45] June 13, 1978

[54] V-GROOVE ROLLING CONTACT ROLLER BEARING

[76] Inventor: Earl W. Traut, 8040 Palm Lake Dr., Orlando, Fla. 32811

[21] Appl. No.: 705,953

[22] Filed: Jul. 16, 1976

Related U.S. Application Data

[62] Division of Ser. No. 511,237, Oct. 2, 1974, Pat. No. 3,989,324.

[51] Int. Cl.² ............................................ F16C 33/51
[52] U.S. Cl. .................................... 308/206; 308/200
[58] Field of Search ............... 308/200, 201, 202, 206, 308/214, 217, 218

[56] References Cited

U.S. PATENT DOCUMENTS

| 1,282,888 | 10/1918 | Lippincott | 308/200 |
| 1,986,274 | 1/1935 | Linn | 308/206 |
| 2,221,151 | 11/1940 | Foley | 308/206 |

*Primary Examiner*—Richard A. Bertsch

[57] ABSTRACT

A combination radial and axial load roller bearing in which the rollers are extended to include V-groove portions and in which a retainer race is affixed radially outwards of the inner race, balls in rolling contact between the V-grooves and the retaining race preventing the rollers from contacting each other and thereby excluding sliding friction.

1 Claim, 1 Drawing Figure

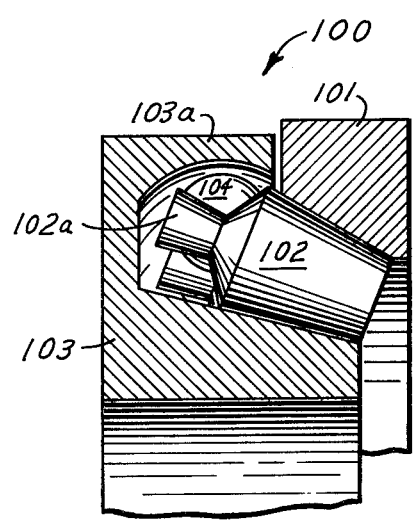

V-GROOVE ROLLING CONTACT ROLLER BEARING

This is a division of application Ser. No. 511,237, filed Oct. 2, 1974, U.S. Pat. No. 3,989,234.

BACKGROUND OF THE INVENTION

In typical ball or roller bearings the rotating elements slide against each other or slide against a cage. This sliding friction causes heat and wear, and necessitates providing clearances and lubrication in the bearing. Several previous U.S. Patents propose bearing devices which avoid sliding friction, but these are excessively complex, too expensive to manufacture, incur a high speed problem, require impossibly close manufacturing tolerances, or are impractical for other reasons.

SUMMARY OF THE INVENTION

Rolling contact bearings are defined as including only rolling contact in the relative movement between their components, there being no sliding friction anywhere. The invention describes a roller bearing in which the ends of the rollers are extended to include V-grooved portions, balls being interposed in rolling contact between these V-grooved portions to prevent the rollers from contacting each other. A retainer race affixed to the inner race and radially outwards of it, holds the balls in position.

Accordingly, it is an object of the invention to provide useful rolling contact bearings which have no sliding friction.

Yet another object of the invention is to provide rolling contact bearings in which lubrication is not essential.

Other objects of this invention will appear from the following description and appended claims, reference being had to the accompanying drawings forming a part of this specification wherein like reference characters designate corresponding parts in the several views.

The FIGURE is a vertical sectional view of the upper portion of a combination radial and axial-load rolling contact roller bearing in which balls positioned between grooves at the ends of the rollers provide separation therebetween.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Device 100 of the FIGURE is a combination radial-load and axial-load rolling-contact roller bearing in which the distance traveled by the spacing balls is increased by having them roll in V-grooves in the load-bearing rollers in compensation for their greater distance from the axis of the bearing. Bearing loads are transferred from outer race 101 through rollers 102 to inner race 103. Retaining balls 104 ride in V-grooves 102a of rollers 102 and are held in position by retaining ring 103a.

I claim:

1. A rolling contact roller bearing comprising:
an inner bearing race,
only one retainer race,
said inner bearing race and said retainer race being circular and coaxial,
said retainer race being located radially outwards of said inner race and affixed thereto,
an outer bearing race,
said outer bearing race being circular, coaxial with said inner race and said retainer race, and free to rotate relative thereto,
first rotating means,
said first rotating means comprising rollers,
said rollers each including a V-grooved portion at one end, second rotating means,
said second rotating means comprising balls,
said balls being alternately interposed between said V-grooves and in rolling contact therewith and with said retainer race, so as to prevent said rollers from contacting each other,
said balls each making only one contact with said retainer race,
said rollers being in rolling contact with said inner race and with said outer race, so as to transfer loads therebetween.

* * * * *